Aug. 23, 1932. J. B. GLOWACKI 1,873,385
SPLIT SUPPORTING LOOP FOR FIXTURES
Filed Feb. 3, 1930
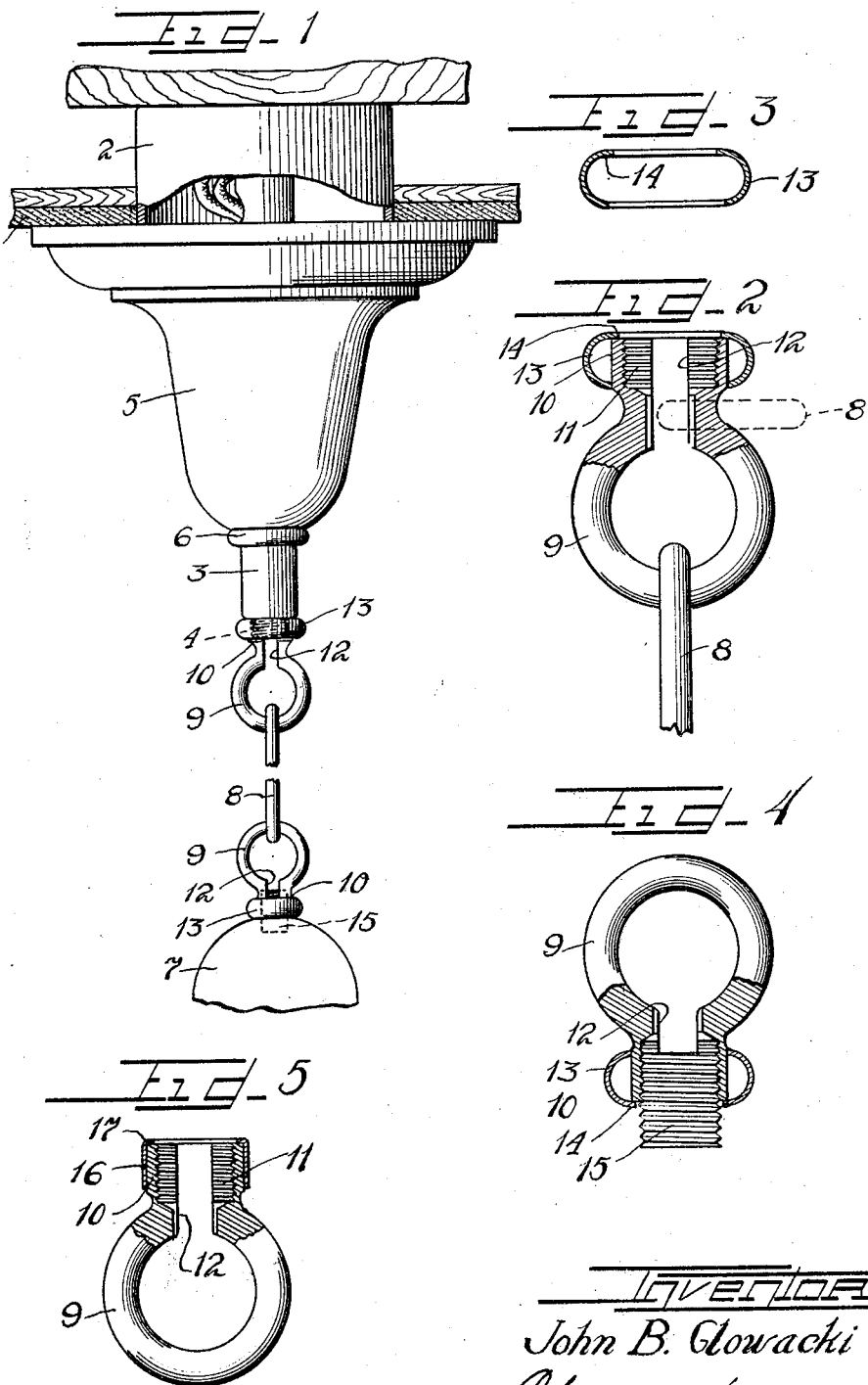
Inventor
John B. Glowacki
by Charles F. Wills Attys Patented Aug. 23, 1932

1,873,385

UNITED STATES PATENT OFFICE

JOHN B. GLOWACKI, OF CHICAGO, ILLINOIS

SPLIT SUPPORTING LOOP FOR FIXTURES

Application filed February 3, 1930. Serial No. 425,412.

Heretofore, in the installing of electric light chain-supported fixtures, a closed supporting loop has been rigidly mounted on the lower end of the fixture-supporting stem, thereby making it necessary to open the uppermost link of the fixture-supporting chain in order to permit the same to be engaged through the closed supporting loop, after which the open link is pinched or closed. The same procedure is also necessary in the old type of fixture support at the lower end of the chain where the lowermost link must be opened in order to engage the same through the closed ring or loop usually provided on the upper portion of the body of the fixture.

In order to obviate the necessity of opening fixture-supporting chain links to permit the same to be engaged through closed fixture loops, this invention has been devised to provide an improved, simplified split supporting loop adapted to be used on a fixture stem or on a fixture and adapted to receive a closed chain link through the split portion of the loop prior to the mounting of said loop on a fixture stem or on a fixture body by means of a coacting lock ring or collar, which, when mounted in position on the split head of the loop, serves as a retaining means to prevent the split end of the loop from opening up and becoming disengaged from the threaded end of the stem or other member of the fixture on which the split loop is engaged.

It is an object of this invention to provide an improved type of split supporting loop with a lock ring adapted to facilitate mounting of a fixture-supporting chain.

It is also an object of this invention to provide a fixture stem or a fixture with either a male or a female split loop with a lock ring removably engaged thereon to permit a link of a fixture-supporting chain to be engaged in the split loop without necessitating opening of the chain link.

It is an important object of this invention to provide an improved type of split fixture-supporting loop adapted to have a fixture-supporting chain link slidably engaged through the split end thereof prior to the engagement of a locking ring on the split end of the loop and before the split loop is mounted in position on the threaded end of a fixture stem or similar device.

Other and further important objects of this invention will be apparent from the specification and the accompanying drawing.

The invention (in a preferred form) is illustrated in the drawing and hereinafter more fully described.

On the drawing:

Figure 1 is a fragmentary elevational view of a fixture stem and canopy associated with a ceiling outlet box and illustrating a fixture-supporting chain associated with improved split supporting loops connected with the fixture stem and with the fixture and embodying the principles of this invention.

Figure 2 is an enlarged elevational view of the improved split supporting loop partly broken away and shown in section, having engaged thereon a lock ring and illustrating the method of engaging the fixture chain on the split loop in dotted lines.

Figure 3 is a diametrical sectional view of the split supporting loop lock ring.

Figure 4 illustrates the improved split supporting loop and lock ring in an inverted position, partly broken away and shown in section and having engaged in the threaded head end thereof a threaded nipple or coupling to convert the split supporting loop from a female type loop to a male type loop.

Figure 5 is an elevational view of a split supporting loop, partly shown in section, and having associated with the split head end thereof a modified form of lock ring.

As shown on the drawing:

The reference numeral 1 indicates a ceiling or wall having supported therein an outlet box 2 in which the upper end of an electric light fixture stem 3 is supported. Integrally formed or secured on the lower end of the fixture stem 3 is an externally threaded shank 4 of reduced diameter and affording a threaded male supporting member for a fixture.

Slidably engaged on the fixture stem 3 below the ceiling 1 is a fixture canopy 5 which is adapted to be held in position against the ceiling 1 by means of a canopy retaining slip ring 6 which has frictional clamping engagement with the stem 3.

Positioned beneath the stem 3 is an electric light fixture or socket 7 which is adapted to be connected by means of a chain and upper and lower split supporting loop units embodying the principles of this invention and adapted to be removably engaged on the fixture stem and on the fixture member 7.

The split supporting loop unit comprises a loop or link 9 having integrally formed radially thereon a head 10 which is hollow and internally threaded at 11. The internally threaded head 10 and the portion of the loop 9 where the head is joined on said loop is split at 12 to permit a closed link of chain 8 to be passed downwardly through the loop, similar to the dotted line arrangement shown in Figure 2, to permit the chain to be engaged on the split loop without requiring opening of the chain link.

After the uppermost link of a chain 8 has been engaged through the split loop 9, a retaining ring or lock ring 13 is slidably engaged over the split head 10, as illustrated in Figure 2, with the upper flange ring portion 14 thereof seated upon the outer end of the split head 10. The locking ring 13 serves to hold the split portions of the head 10 against springing outwardly away from one another. With the lock ring engaged on the split head of the loop and with the chain 8 engaged on the split loop as described, the split head is adapted to be threaded onto the threaded supporting shank 4 provided on the lower end of the fixture stem 3, as illustrated in Figure 1. With the split head 10 engaged on the shank 4, it is impossible to compress the head, so that the same is actually locked within the locking ring 13 against accidental removal or pulling off of the threaded shank 4 of the fixture stem.

In a manner similar to that hereinbefore described, the lowermost link of the fixture chain 8 is adapted to be engaged through the split head 10 of a lower split loop 9, after which a locking ring 13 is adapted to be engaged over the split head 10, as illustrated in Figure 4. If the fixture or socket 7 is of the female type having an internally threaded recess in the upper mounting end thereof, the improved split supporting loop may be converted from the female type illustrated in Figure 2 into the male type, illustrated in Figure 4. This is accomplished by merely threading an externally threaded bushing or nipple 15 into the internally threaded split head 10, leaving a portion of the threaded bushing or nipple 15 projecting beyond the flange 14 of the lock ring 13 so that the threaded projecting end of the nipple may be threaded into the internally threaded recess provided in the socket or fixture 7 which is to be supported on the lower end of the chain 8.

The locking rings 13 engaged on the upper and lower split loop units are of the rounded bead type to correspond to the rounded bead forming a part of the canopy slip ring retaining member 6. While a rounded bead type lock ring 13 is illustrated and described, it will, of course, be understood that the design of the lock rings may be developed to correspond with the fixture parts with which the split supporting loop units are to be used.

Figure 5 illustrates a split supporting loop having a modified form of locking ring unit engaged thereon. The modified locking ring comprises a straight ring or band 16 provided with an inwardly directed flange 17 at the outer end thereof adapted to seat against the end of the split head to hold the lock ring in a set position of adjustment on the head of the split loop.

In the assembly and use of a fixture and its mounting, the lower split supporting loop 9 has the lowermost link of the chain 8 engaged through the split head thereof, after which the lower locking ring 13 is engaged over the head and the nipple 15 is threaded into position in the head 10, as illustrated in Figure 4. The nipple may now be engaged with the fixture 7, with the wires from the fixture passing upwardly through the nipple and laced through the links of the chain, passing upwardly through the upper split supporting loop after the uppermost link of the chain has been engaged through the slot 12 of the loop. The locking ring 13 of the upper loop is now engaged on the head of the loop and the wires from the fixture are inserted through the stem 3, with the upper ends of the wires projecting out of the hickey forming a part of the stem. Before the upper split loop is engaged on the lower end of the stem 3, the canopy 5 and the slip ring 6 are engaged on the stem, after which the head of the upper split loop with the lock ring engaged thereon is threaded onto the threaded shank 4 engaged on the lower end of the stem 3. With the fixture supported on the lower end of the stem 3 by means of the chain 8 and the improved split supporting loops and lock rings, the canopy and slip ring 6 are moved into position on the lower end of the stem, permitting the upper end of the stem 3 to be engaged in the ceiling outlet box 2, allowing sufficient room above the canopy to permit the wires from the fixture to be connected with the lead wires in the outlet box. After the wires have been connected in the outlet box, the canopy and slip ring are pushed upwardly on the stem 3 into the position illustrated in Figure 1, with the upper end of the canopy seated against the ceiling and with the canopy held in position by means of the frictional gripping contact of the slip ring 6 with the stem 3.

The improved split type of supporting loop, together with the locking ring, is adapted to be engaged either on a fixture stem or on a fixture after a chain link has been engaged through the split opening of the loop. While a chain is illustrated and described as being the connecting member between the fixture split supporting loop and the fixture stem split supporting loop, it will, of course, be understood that any other type of a connecting member may be used between the two split loops, such as a fixture supporting bar having ring members engaged on the ends thereof. Attention is also directed to the fact that where necessary the chain or connecting member may be omitted and the lower split supporting loop may be engaged through the upper split loop, thereby connecting the fixture and the fixture stem by means of the two interfitting split loops.

It will, of course, be understood that various details of construction may be varied through a wide range without departing from the principles of this invention, and it is, therefore, not purposed to limit the patent granted hereon otherwise than necessitated by the scope of the appended claims.

I claim as my invention:

1. A fixture supporting device comprising a split loop, an internally threaded split head integrally formed on said loop, a lock ring removably engaged around said split head before mounting of said loop, and a flange formed on said lock ring and seated on the outer end of the split head to hold the ring in position, and a supporting member threaded into the split head and clamping said flange thereon.

2. The combination with a fixture supporting stem, of a split loop adapted to have a fixture supporting member engaged therein before attachment of the split loop directly on said stem, and a locking member engaged on said split loop before mounting of the split loop to hold the same locked against accidental removal from said stem, said locking member clamped in place between the stem and said split loop.

3. A fixture support comprising an open loop, recessed internally threaded head sections integrally formed on the ends of said open loop with said head sections spaced apart and having a receiving slot therebetween of sufficient width to receive a closed fixture supporting member therethrough without requiring further separation of said head sections, and a locking means supported on the head sections and enclosing the same to hold the head sections from separating when they are engaged on a fixture stem.

4. A fixture support comprising an open loop, a split head on the open portion of said loop having a slot therein of sufficient width to removably receive a closed fixture supporting link therethrough without necessitating forcing apart of the parts forming the split head, and a locking means removably engaged on the split head for holding the split head against further opening when the split head is engaged on a fixture stem.

In testimony whereof I have hereunto subscribed my name at Chicago, Cook County, Illinois.

JOHN B. GLOWACKI.